United States Patent
Lau

(10) Patent No.: US 9,260,024 B1
(45) Date of Patent: Feb. 16, 2016

(54) DISTANCE-BASED CHARGING FOR ELECTRIC VEHICLES

(71) Applicant: Lawrence Michael Lau, San Francisco, CA (US)

(72) Inventor: Lawrence Michael Lau, San Francisco, CA (US)

( * ) Notice: Subject to any disclaimer, the term of this patent is extended or adjusted under 35 U.S.C. 154(b) by 0 days.

(21) Appl. No.: 14/543,848

(22) Filed: Nov. 17, 2014

Related U.S. Application Data

(60) Provisional application No. 61/905,248, filed on Nov. 17, 2013.

(51) Int. Cl.
*B60L 11/18* (2006.01)

(52) U.S. Cl.
CPC .................................. *B60L 11/1816* (2013.01)

(58) Field of Classification Search
CPC ... Y02T 10/7044; Y02T 90/14; Y02T 90/128; Y02T 90/168; B60L 11/1816; B60L 11/1824; B60L 11/1818; B60L 11/1837; B60L 11/184; B60L 11/1848; B60L 11/1862; B60L 2240/72; B60L 2260/50; B60L 2260/52; B60L 2260/54; H02J 7/042; Y04S 30/01; Y04S 30/327; Y10S 320/11
See application file for complete search history.

(56) References Cited

U.S. PATENT DOCUMENTS

| | | | |
|---|---|---|---|
| 8,509,976 B2* | 8/2013 | Kempton | 701/22 |
| 2010/0042853 A1* | 2/2010 | Diab et al. | 713/300 |
| 2011/0202418 A1* | 8/2011 | Kempton et al. | 705/26.1 |
| 2011/0207340 A1* | 8/2011 | Cairns | 439/18 |
| 2014/0239891 A1* | 8/2014 | Martin et al. | 320/108 |

FOREIGN PATENT DOCUMENTS

| | | | |
|---|---|---|---|
| JP | 2010035333 A | * | 2/2010 |
| JP | 2010252520 A | * | 11/2010 |
| WO | WO 2014143006 A1 | * | 9/2014 |

* cited by examiner

*Primary Examiner* — Rodney Butler

(57) ABSTRACT

An electric vehicle receives an amount of power sufficient to travel a particular distance. The distance is received. The amount of power required by the electric vehicle to travel the distance is calculated. Power is allowed to be transferred to the electric vehicle. When an amount of power transferred is sufficient for the distance, the transfer of power is terminated.

20 Claims, 11 Drawing Sheets

DISTANCE-BASED CHARGING FOR ELECTRIC VEHICLES

CROSS-REFERENCE TO RELATED APPLICATIONS

This patent application claims priority to U.S. provisional patent application 61/905,248, filed Nov. 17, 2013, which is incorporated by reference along with all other references cited in this application.

BACKGROUND OF THE INVENTION

The present invention relates to the field of electric vehicles, and more specifically, to charging electric vehicles.

As countries seek to address future energy requirements in a rapidly growing and changing world, achieving sustainable transportation has emerged as a vital mission. Electric vehicles (EVs) represent one of the most promising pathways to increased energy security and reduced emissions of greenhouse gases and other pollutants. EVs reduce dependence on petroleum and tap into a source of electricity that is often domestic and relatively inexpensive.

The infrastructure needed to support wide-spread adoption of EVs is steadily growing. EV's continue to evolve and improve. Today's EV's are more efficient, dependable, and affordable than those introduced just a few years ago. There is a continued need for new and improved systems and techniques for EV charging which will generally help to spread the adoption of EV.

BRIEF SUMMARY OF THE INVENTION

A charging cable for charging an electric vehicle with another electric vehicle includes a distance-based automatic shutoff mechanism. A distance is received. Power is allowed to be transferred from one electric vehicle to the other electric vehicle via the charging cable. When an amount of power transferred is sufficient for the distance, the transfer of power is terminated.

In a specific embodiment, a device includes a cable, a first connector, connected to an end of the cable, and having a first end, a second connector, connected to an opposite end of the cable, and having a second end, a switch, connected between the first and second ends, an input device to receive a distance, and a controller, connected to the input device and the switch, where the controller monitors power passed by the switch from the first end, through the cable, to the second end, and when an amount of power passed is determined to be sufficient for the distance, the controller disables the switch from passing power.

A unit of measure for the distance may include miles or kilometers. A shape of the first end may be the same as a shape of the second end. In a specific embodiment, the controller calculates the amount of power sufficient for the distance based on a calculation involving the distance and a metric, where the metric indicates an energy conversion efficiency of a first electric vehicle connected to the cable.

The first connector may include a first locking mechanism that secures the first connector to a first electric vehicle, and the second connector may include a second locking mechanism that secures the second connector to a second electric vehicle.

The first connector may include a first keying mechanism to be received by a first complementary receptacle of a first electric vehicle, and the second connector may include a second keying mechanism to be received by a second complementary receptacle of a second electric vehicle.

In another specific embodiment, a method includes receiving a first input including a distance, enabling a switch of a charging cable to permit power to be drawn from a first electric vehicle connected to the charging cable for a second electric vehicle connected to the charging cable, monitoring an amount of power drawn from the first electric vehicle, determining that the amount of power drawn from the first electric vehicle is sufficient for the distance, and upon the determination, disabling the switch.

The method may further include receiving a second input including an efficiency metric associated with the first electric vehicle, and multiplying the distance and the efficiency metric to calculate an amount of power to draw from the first electric vehicle.

The method may further include displaying on an electric screen of the charging cable an estimated amount of time to draw an amount of power from the first vehicle that is sufficient for the distance.

The method may further include receiving a second input including an efficiency metric associated with the second electric vehicle, and multiplying the distance and the efficiency metric to calculate an amount of power to draw from the first electric vehicle. The efficiency metric may indicate one of energy consumed per unit of distance traveled or distance traveled per unit of energy consumed.

The method may further include after the determining that the amount of power drawn from the first electric vehicle is sufficient for the driving distance, generating an alert.

In another specific embodiment, a method includes receiving a first input including a distance, receiving a second input including an efficiency metric associated with an electric vehicle, making a calculation involving the distance and the efficiency metric to determine an amount of power to transfer to the electric vehicle, allowing power to be transferred to the electric vehicle, and when an amount of power transferred to the electric vehicle reaches the calculated amount of power to transfer, not allowing power to be transferred to the electric vehicle.

The making the calculation may include multiplying the distance with the efficiency metric. The distance may be expressed as a number of miles and the efficiency metric may be expressed as a number of energy hours per mile.

The energy hours may include one of watt-hours or kilowatt-hours. In a specific embodiment, the method includes when the amount of power transferred reaches the calculated amount of power to transfer, generating an alert. The alert may include a text message.

The allowing power to be transferred may include enabling a switch connected between a power source and the electric vehicle, and the not allowing power to be transferred may include disabling the switch.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
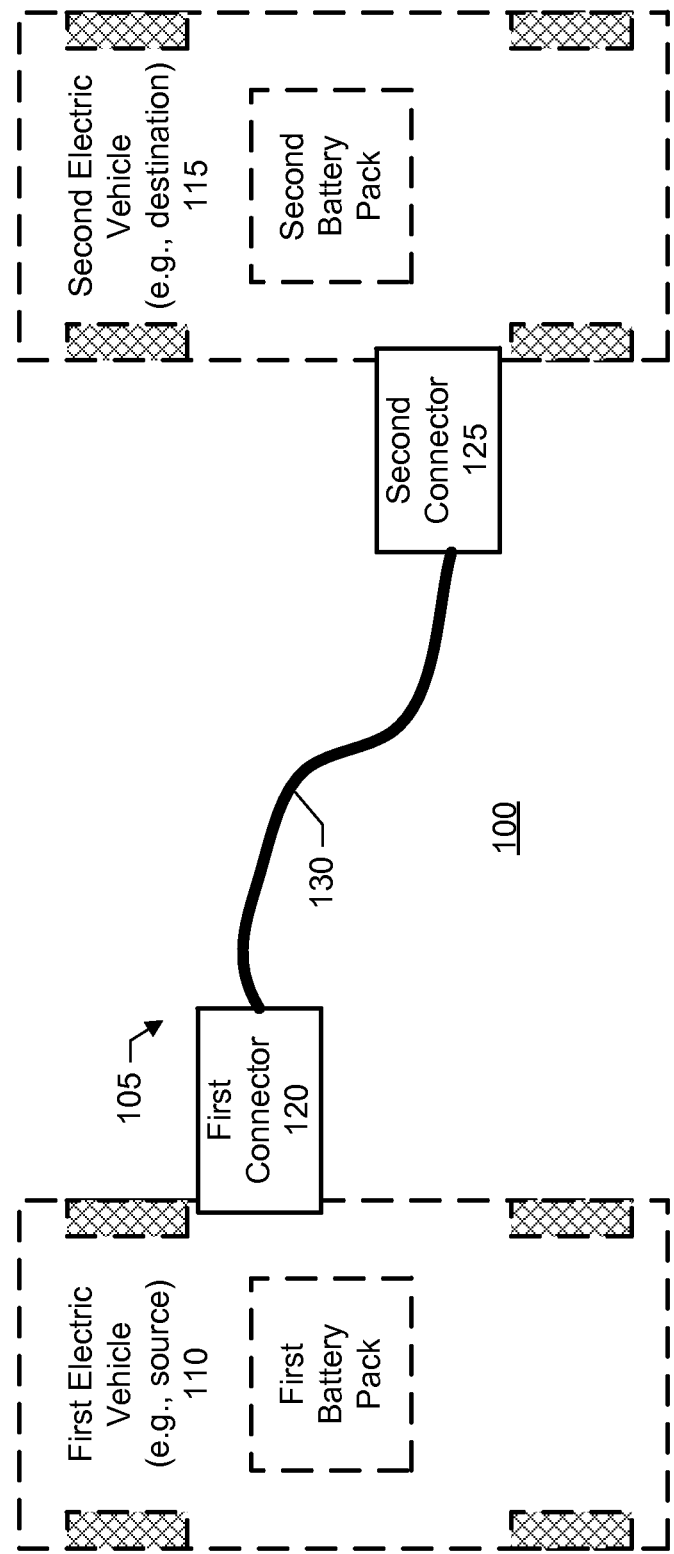
FIG. 1 shows a simplified block diagram of a system having a charging cable for charging an electric vehicle with another electric vehicle.

FIG. 1 shows a simplified block diagram a system 100 for charging a vehicle. This system includes a charging cable 105 connected between a first vehicle 110 and a second vehicle 115. The charging cable includes a first connector 120, a second connector 125, and a cable 130 connected between the first and second connectors. In the example shown in FIG. 1, the first connector is connected to an end 135 of the cable and to the first vehicle. The second connector is connected to an opposite end 140 of the cable and to the second vehicle.

In a specific implementation, the first and second vehicles are electric vehicles. An electric vehicle uses one or more electric motors or traction motors for propulsion. Typically, in this specific implementation, the charging cable is used to charge one of the first or second vehicles by using another of the first or second vehicles as a power source.

For example, the charging cable can be used to supply or transfer electrical power from the first vehicle to the second vehicle. The vehicle providing the power may be referred to a source vehicle. The vehicle receiving the power may be referred to as a destination, receiving, or target vehicle.

A user, such as a driver of one of the vehicles, connects an end of the charging cable to one of the vehicles, and connects an opposite end of the charging cable to another of the vehicles. The charging cable includes an automatic shutoff mechanism. When the automatic shutoff mechanism is triggered by a triggering event, the mechanism prevents, blocks, disallows, or interrupts the power being transferred from the source vehicle, through the cable, to the destination vehicle.

In a specific implementation, the triggering event is based on a user-inputted distance. In this specific implementation, the user of the system inputs a distance (e.g., 20 miles or 32 kilometers). The system receives the input distance and calculates an amount of power to transfer based on the input distance. The system monitors the power being transferred from the one vehicle (e.g., first vehicle 110) to the other vehicle (e.g., second vehicle 115). When the amount of power transferred reaches the amount of power to transfer the automatic shutoff is triggered and the power transfer is halted or terminated.

The automatic shutoff helps to prevent the battery of the source vehicle from being depleted. A specific application of the charging cable is emergency use or other situations where it is desirable to transfer power based on distance. The charging cable is portable. This allows the charging cable to be stored inside a vehicle so that it will be available for emergencies.

Consider, as an example, a scenario where one of the vehicles (e.g., second vehicle) is without battery power or is running low on battery power. The nearest charging station is still several miles away. So, the second vehicle has pulled into a rest stop along the highway to wait for help.

The first vehicle has some battery power to spare. The charging cable can be connected between the two vehicles so that power can be transferred from the first vehicle to the second vehicle. A driver of the first vehicle can input a number of miles to "donate" or "provide" to the second vehicle. Based on the inputted value, the system calculates an amount of power to transfer from the first vehicle for the second vehicle.

The system monitors the power transfer. Once an amount of power transferred has reached the calculated amount of power to transfer, the automatic shutoff mechanism is triggered, thereby preventing any further power from being extracted from the first vehicle. The automatic shutoff mechanism helps to ensure that the driver of the first vehicle will not become stranded himself.

Figure 2:
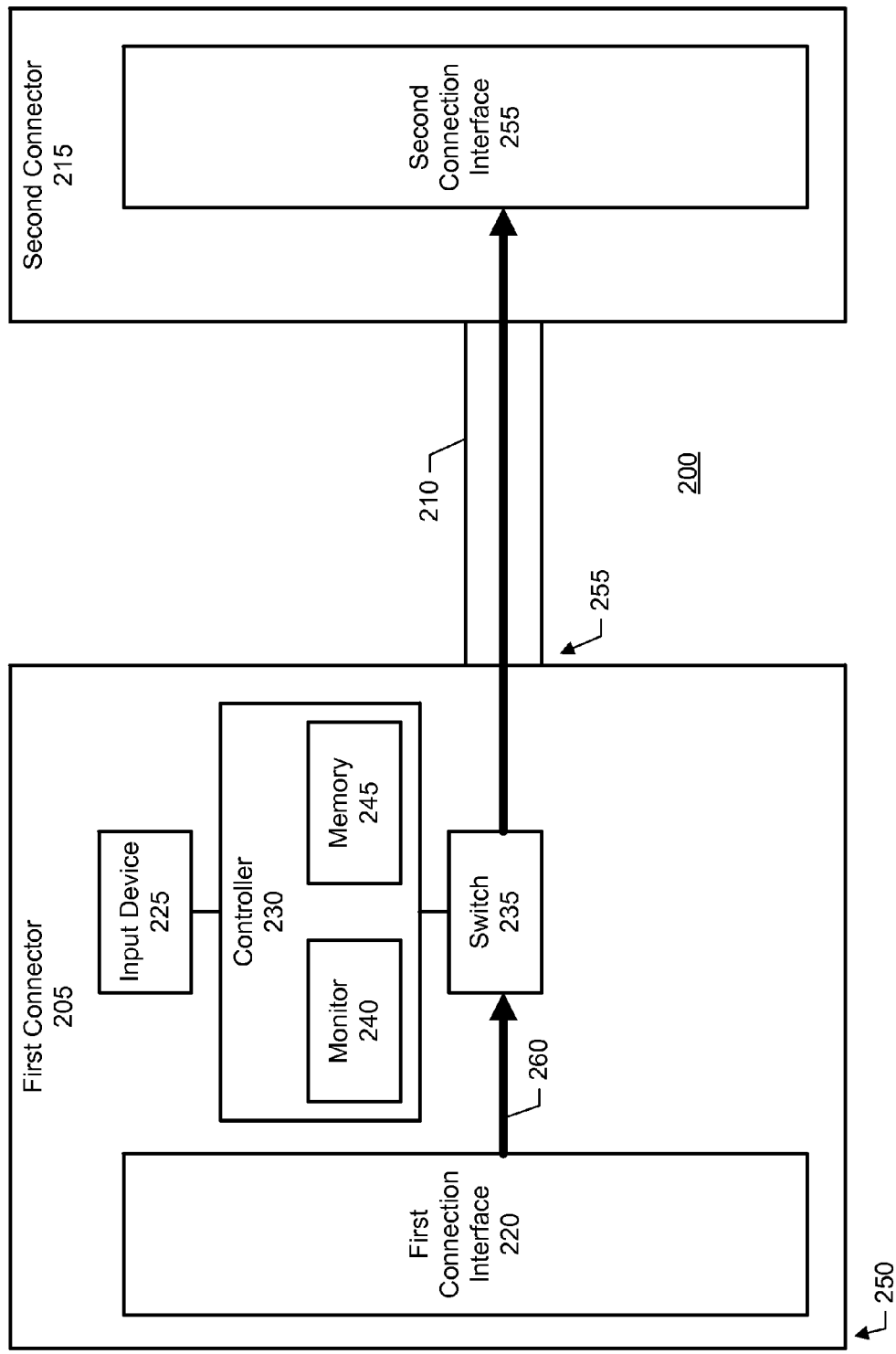
FIG. 2 shows a specific implementation of the charging cable.

FIG. 2 shows a more detailed block diagram of the charging cable shown in FIG. 1. A charging cable 200 includes a first connector 205 connected to an end of a cable 210, and a second connector 215 connected to an opposite end of the cable.

In an implementation, the cable includes a set of wires to carry electric current. The cable can include standard electrical wiring (e.g., copper or aluminum wiring). In a specific implementation, the cable includes copper wiring. Copper is desirable as a conductor because of its high electrical conductivity, tensile strength, ductility, creep resistance, corrosion resistance, thermal conductivity, coefficient of thermal expansion, solderability, resistance to electrical overloads, compatibility with electrical insulators, and ease of installation. For example, copper has an electrical resistivity of about $1.7 \times 10\text{-}8$ ohm meter ($\Omega$m) which is one of the highest electrical conductivity ratings of all non-precious metals.

In this specific implementation, the copper wires in the cable may be bare, or they may be plated with a thin layer of another metal, such as tin, gold, silver, or some other material. Tin, gold, and silver are less prone to oxidation than copper, which may lengthen wire life and ease soldering.

Another example of a material suitable for conducting electricity is aluminum. Aluminum wire was common in North American residential wiring from the late 1960s to mid-1970s due to the rising cost of copper. The resistivity of aluminum is about $2.6 \times 10\text{-}8$ $\Omega$m, which is greater than the resistivity of copper. Aluminum, however, weighs less as compared to copper and can be less expensive than copper. Generally, the electrical resistance of a wire is greater for a longer wire as compared to a shorter wire. The resistance is less for a wire of larger cross-sectional area as compared to a smaller cross-sectional area. The resistance further depends on the material and can be expressed as:

$$R = \rho L/A \tag{1}$$

where

R=resistance (ohm, $\Omega$)

$\rho$=resistivity coefficient (ohm m, $\Omega$m)

L=length of wire (m)

A=cross sectional area of wire (m2)

Another example of a material suitable for conducting electricity is silver. Silver has a lower electrical resistivity than copper. Silver, however, is more expensive and has a lower tensile strength as compared to copper. The type of material used for the electrical wiring depends upon factors such as the material properties, desired physical dimensions (e.g., length or cross-sectional area), material cost, and others. In some embodiments, copper wiring is used. In other embodiments, a different material is used (e.g., aluminum or silver).

In a specific implementation, the wiring is stranded. Stranded wire has a group of wires (e.g., copper) braided or twisted together. Stranded wire is more flexible than a large single-strand wire of the same cross section. A flexible cable can be more easily coiled than a rigid cable. This flexibility can be desirable because it allows the charging cable to be easily coiled and stowed in the vehicle and then uncoiled for use. In another specific implementation, the wiring is solid core.

The cable may include features to help reduce undesirable electromagnetic pickup and transmission. Such features can include shielding, coaxial geometry, and twisted-pair geometry.

The electrical wiring may be enclosed in a flexible cable jacket. The cable jacket can be used to help insulate and protect the internal components of a cable, and improve the cable's appearance or usability. The cable jacket may be made of a polymer such as plastic or thermoplastic.

Some specific examples of materials that may be suitable for the cable jacket include polyvinyl chloride (PVC), polyethylene, polypropylene, polyurethane, polyvinylidene difluoride (PVDF), fluorinated ethylene propylene (FEP), thermoset, natural rubber, styrene-butadiene rubber (SBR), synthetic rubber, neoprene, ethylene propylene diene monomer (M-class) rubber (EPDM rubber), silicone rubber, hypalon, kevlar, and others.

In a specific implementation, the cable includes a line for carrying data. The data line can be used to send data, receive data, or both. For example, data may be sent from the first vehicle and received at the second vehicle, or vice-versa. The data can include information specifying battery charging or operational parameters of the source battery, destination battery, or both, charging status, or combinations of these. Some specific examples of data that may be carried by the data line include battery type, model number, manufacturer, characteristics, discharge rate, predicted remaining capacity, discharge alarm, temperature, voltage, battery capacity, output current specifications, or combinations of these.

The data may be communicated using any protocol. In a specific implementation, data is communicated using a vehicle bus protocol. Some examples of such protocols include Byteflight, Controller Area Network (CAN), Domestic Digital Bus (D2B), FlexRay, DC-BUS, IDB-1394, IEBus, Inter-Integrated Circuit (IIC), ISO-91414/41-I/-II, J1708, J1587, J1850, J1939, ISO 11783, Keyword Protocol 2000 (KWP2000), Local Interconnect Network (LIN), Media Oriented Systems Transport (MOST), Multifunction Vehicle Bus, Train Communication Network IEC 61375, SMARTwireX, Serial Peripheral Interface Bus (SPI), or Vehicle Area Network (VAN).

Other examples of protocols or standards that may be used in an embodiment include CHAdeMO, SAE Surface Vehicle Recommended Practice J1772, SAE Electric Vehicle Conductive Charge Coupler (SAE J1772), Type 2: VDE-AR-E 2623-2-2, or IEC 62196—just to name a few examples. Data may instead or additionally be communicated using Ethernet, TCP/IP, wireless technologies (e.g., Bluetooth, near field communication (NFC), dedicated short-range communications (DSRC), ZigBee, or IPv6 over Low power Wireless Personal Area Networks (6LoWPAN)), or combinations of these.

The data line can include one or more fiber optic cables, single wire, twisted pair, IEEE 1394, MIL-STD-1553, MIL-STD-1553, or power line communication (PLC).

In a specific embodiment utilizing a data line, the data line and the electrical wiring are enclosed within one end, or both ends of the flexible cable jacket. The data line and electric wiring may be bundled together in the same flexible cable jacket. Reducing the number of exposed cables lowers the likelihood that the cables will get entangled. In another specific embodiment, the data line and the electrical wiring are not enclosed together and instead each of the data line and the electrical wiring are enclosed in their own flexible cable jacket.

A connection of the charging cable to the vehicle via the connector can be an electrical connection, an optical connection, a wired connection including any number of wires (e.g., one, two, three, four, five, six, or more than six wires), or any combination of these or other types of connections. In other implementations, however, the connection can include a wireless connection such as via radio frequency (RF), infrared communication, Bluetooth, and the like.

In a specific implementation, the length of the cable ranges from about 3 meters to about 9 meters. This includes, for example, 4, 5, 6, 7, 8, 8.9 meters, or more than 9 meters. The length of the cable may be less than 3 meters. As discussed above, a specific application of the cable is a charging cable for emergency situations. Longer cable lengths allow for the two vehicles to be parked further apart.

For example, in some cases, it may not be possible for the two vehicles to be parked side-by-side. The electrical outlet port of one vehicle may be on the same or different side of the electrical inlet port of the other vehicle. The two vehicles may be parked on the shoulder of the road. In order to not impede the flow of traffic, the vehicles may be parked in-tandem. That is, one vehicle may be parked behind the other vehicle.

Long cable lengths can be desirable in situations where it is not possible to have the electrical outlet port of the source vehicle immediately adjacent to the electrical inlet port of the destination vehicle. Increasing the length of cable, however, increases resistivity and material cost. Thus, factors such as convenience, safety, performance, and others may be considered when selecting a particular length of cable.

In a specific implementation, an area of a cross-section of the cable is about 707 square millimeters. The area, however, can range from about 315 square millimeters to about 3,000 square millimeters. This includes, for example, 400, 500, 1,000, 1,500, 2,000, 2,999 square millimeters, or more than 3,000 square millimeters. The area may be less than 315 square millimeters.

Factors affecting the cross-sectional area include material cost, material type, cable length, resistivity, heat generated during charging, cable flexibility, and desired rate of charge. For example, cables with large cross-sectional areas can carry more kilowatts and provide faster charging as compared to cables with small cross-sectional areas. Cables with small cross-sectional areas, however, can be less expensive, easier to coil, and are lighter as compared to cables with large cross-sectional areas.

In a specific implementation, a shape of a cross-section of the cable includes a circle. In this specific implementation, a diameter of the cable may range from about 10 millimeters to about 30 millimeters. This includes, for example, 11, 12, 13, 14, 15, 16, 17, 18, 19, 20, 25, 29.9 millimeters, or more than 30 millimeters. The diameter may be less than 10 millimeters. In other implementations, the shape of the cross-section may be an oval, rectangle, square, obround, or other shape.

First connector 205 includes a first connection interface 220, an input device 225, a controller 230, and a switch 235. The controller includes a monitor 240 and memory 245. The first connection interface is at a first end 250 of the connector, opposite a second end 255 of the connector where the cable exits. The switch is connected between the first connection interface and the cable. The controller is connected to the switch and input device. The components can be linked together using any interconnection scheme such as a bus.

The first connection interface provides an interface or mechanical assembly for joining or mating the first connector to the electrical charging circuitry of the vehicle (e.g., first vehicle). For example, the first vehicle may include a port, socket, jack, or other opening into which the first connector may plugged. Depending upon the type of vehicle, the charging port may be capable of receiving and discharging electrical power. The vehicle may instead or additionally have a different port for discharging electrical power. The first connection interface may be adapted or configured to plug into a socket or other port, recess, or opening of the first vehicle that outputs power.

In a specific embodiment, the first connection interface includes a male plug. The male plug is designed to plug into a female receptacle of the vehicle. The plug includes one or more pins or prongs that are inserted into openings of the female receptacle.

In another embodiment, the plug and receptacle components are swapped. That is, in this specific embodiment, the first connection interface includes the female receptacle that receives the male plug of the vehicle.

Examples of plug types that may be suitable for the charging cable include Type 1 (SAE), Type 2 (VDE), Type 3 (EV-Plug), or JARI Level 3 DC. The first connection interface may be designed to conform to CHAdeMO specifications, SAE J1772 specifications, Mennekes connector specification, "Type 2" implementation to IEC 62196, VDE-AR-E 2623-2-2 standard, or others.

The second connector includes a second connection interface 255. A form factor of the first conductor may be the same as or different from a form factor of the second conductor. In a specific implementation, the second connection interface is the same as the first connection interface.

For example, the first and second connection interfaces may each conform to the CHAdeMO specification. An orientation, position, location, or layout of the conductors in the first connection interface may be the same as the orientation, position, location, or layout of the conductors in the second connection interface. A number of conductors in the first connection interface may be the same as a number of conductors in the second interface. A size of the conductors in the first interface may be the same as a size of the conductors in the second interface. This specific embodiment of the cable allows the cable to be used for two electric vehicles having the same type of electrical ports.

In another specific implementation, the first connection interface is different from the second connection interface. For example, the first connection interface may conform to the CHAdeMO specification. The second connection interface may conform to the SAE J1772 specification. This allows one vehicle designed for a particular connection type to charge another vehicle designed for a different connection type.

In this specific implementation, an orientation, position, location, or layout of the conductors in the first connection interface may be different from the orientation, position, location, or layout of the conductors in the second connection interface. A number of conductors in the first connection interface may be different from a number of conductors in the second interface. A size of the conductors in the first interface may be different from a size of the conductors in the second interface.

The first connector, second connector, or both may have a locking mechanism (e.g., insert connector, and then twist or screw to lock. A locking mechanism helps to secure the charging cable to vehicle and prevent accidental removal. The cable will need to be unlocked before it can be removed from the vehicle (e.g., untwist or unscrew connector, and then pull). The locking mechanism can include a lug closure, press-fit, snap-fit, threaded-collar, or interference fit components, or combinations of these.

The first connector, second connector, or both may have a keying feature. The keying feature helps to ensure that the connector can be inserted only into a connector receptacle of the corresponding vehicle in one or more specific orientations. This helps to ensure that proper connections are made.

The keying feature may include a nub designed to fit into a complementary recess. In a specific implementation, a nub is included on the connector. The complementary recess is included with the connector receptacle of the vehicle. In another specific implementation, the keying features are swapped. A nub is included with the connector receptacle of the vehicle. A complementary recess is included with the connector.

A connector may also have a second keying feature that provides an indication to the vehicle that the charging cable is attached. The port or receptacle of the vehicle that receives the connector may be used for both receiving electrical power and outputting electrical power. When the connector is inserted, the vehicle can use the second keying feature to determine that the charging cable is connected. Then, the vehicle can perform the appropriate functions, use the proper algorithms, or otherwise make adjustments in its operation for the charging cable. The second keying feature can use any type of coding system to identify the charging cable including binary coding.

A connector may include indicators. The indicators may be color indicators that are painted on, or raised indicators, or both. The indicators help the user to properly attach and detach the charging cable to the vehicle. For example, the connector may include an arrow. The vehicle part may include a corresponding arrow. Alignment of the arrows indicates proper attachment of the charging cable. There can be instructions printed on a connector, cable, or both that instruct the user on the proper attachment of the charging cable.

The switch is an electrical component. The switch can include a switching circuit, electrical switch, relay, solid-state relay (SSR), semi-conductor device (e.g., silicon controlled rectifier, semiconductor-controlled rectifier, triode for alternating current (TRIAC), or analogue switch), mechanical switch (e.g., electromagnet switching mechanism), or the like.

In an implementation, when the switch is enabled, power can be transferred from one vehicle to the other vehicle. For example, the switch may pass power from the source vehicle to the destination vehicle. When the switch is disabled, the flow of power is interrupted. Power will not be passed from the source vehicle to the destination vehicle. The switch may be used to establish and break an electrical circuit between the source and destination vehicles. The switch can control a binary state or mode of the charging cable (e.g., charging or not charging).

In a specific implementation, the input device includes a user interface input device such as a keyboard, keypad, or touchscreen display. In this specific implementation, the input device allows a user, such as a driver of a vehicle, to input a distance. In general, use of the term "input device" is intended to include all possible types of devices and ways to input information into the system. For example, the input device may include a voice recognition subsystem including a microphone to receive audio input (e.g., speech). The input device may include a radio receiver to receive wireless signals (e.g., Bluetooth wireless signals). The user may be a human user, a device, another computer, one or both electric vehicles, or combinations of these.

Although not shown in the example of FIG. 2, a connector may include a user interface output device. The output device may include a display (e.g., electronic screen), a non-visual display (e.g., audio output device), a notification subsystem (e.g., text message notification), or combinations of these. The input and output devices allow user interaction with the system. In a specific implementation, the connector includes a touchscreen display for receiving input and displaying output.

Input can include finger input (e.g., finger tapping, finger dragging, or "pinch" gestures). Output can include graphics, text, numbers, images, video, audio, vibration, sound, visual alerts, audio alerts, or combinations of these. The text and numbers may be displayed in specific languages such as English, Spanish, French, Japanese, Chinese, German, and so forth. The display language can be user-programmable.

The controller is responsible for directing the operation of the switch based on input received from the input device. The controller can include a processor to execute instructions. The controller may include one or more modules to help regulate the power provided to the destination vehicle.

There can be modules to control and determine charge rate, circuit protection modules, passive power modules (e.g., filters, transient filter capacitors, or inductors), electric power converters, sensing modules (e.g., voltage sensor, current sensor, current transformer (CT), Rogowski coil, shunt, hall effect sensor, waveform sensor, powerflow sensor, or Micro-Electro-Mechanical Systems (MEM)-based sensor), and so forth—just to name a few examples.

The controller may include a battery to power the electric components of the charging cable. In a specific embodiment, a housing for the battery is designed so that the battery is non-replaceable by the end-user. A non-replaceable design can help to simplify the manufacture of the charging cable. In this specific embodiment, the battery can be a rechargeable battery. In another specific embodiment, the battery housing is designed so that it can be accessed by the end-user. This allows the end-user to replace the battery. The battery may be a non-rechargeable or disposable battery. In another specific embodiment, the electrical components of the charging cable may be powered by the battery pack of the electric vehicle (e.g., source vehicle, destination vehicle, or both). In an embodiment, the charging cable does not include a battery or other source of power.

As discussed above, in an implementation, the controller includes monitor 240 and memory 245. The monitor is responsible for tracking the amount of power drawn from the battery pack of the source vehicle, the amount of power provided to the destination vehicle, or both. In a specific implementation, the monitor includes a solid-state or electronic meter including a metering engine, and processor to measure energy parameters. Some examples of parameters that may be measured include voltage, current, temperature or heat, or combinations of these.

In another specific implementation, the monitor includes an electromechanical meter (e.g., electromechanical induction meter). Generally, an electromechanical induction meter operates by counting the revolutions of a non-magnetic, but electrically conductive, metal disc. The disc rotates at a speed proportional to the power passing through the meter. The number of revolutions is thus proportional the power drawn.

The memory can include non-volatile memory, volatile memory, random access memory, flash memory, solid state storage, hard disk storage, or other memory type, or combination of memory types. Aspects of the invention may include software executable code or firmware (e.g., code stored in a read-only memory or ROM chip). The software executable code or firmware may embody algorithms used in calculating the amount of power to transfer, determining when to interrupt the power transfer, and so forth.

The software executable code or firmware may include code to implement a user interface for a user using the charging cable. The user interface displays results on the display, receives user input, and receives selections that specify parameters that affect the operation of the system. Memory or storage components can be used to store instructions, logic, computer code, firmware, user inputted data (e.g., input distance), calculation results (e.g., amount of power to draw), and so forth. In an embodiment, the system may receive and install software (e.g., firmware) updates via a communication network such as the Internet.

Further, a computer-implemented or computer-executable version of the invention may be embodied using, stored on, or associated with a computer-readable medium or computer program produce. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on a mass storage device. Source code of the software of the present invention may also be stored or reside on a mass storage device (e.g., hard disk, magnetic disk, tape, or CD-ROM). As a further example, code of the invention may be transmitted via wires, radio waves, or through a network such as the Internet. Firmware may be stored in a ROM of the system.

Computer software products may be written in any of various suitable programming languages, such as C, C++, C#, Pascal, Fortran, Perl, Matlab (from MathWorks, www.mathworks.com), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans or Enterprise Java Beans (EJB) as provided by Oracle Corporation.

Figure 3:
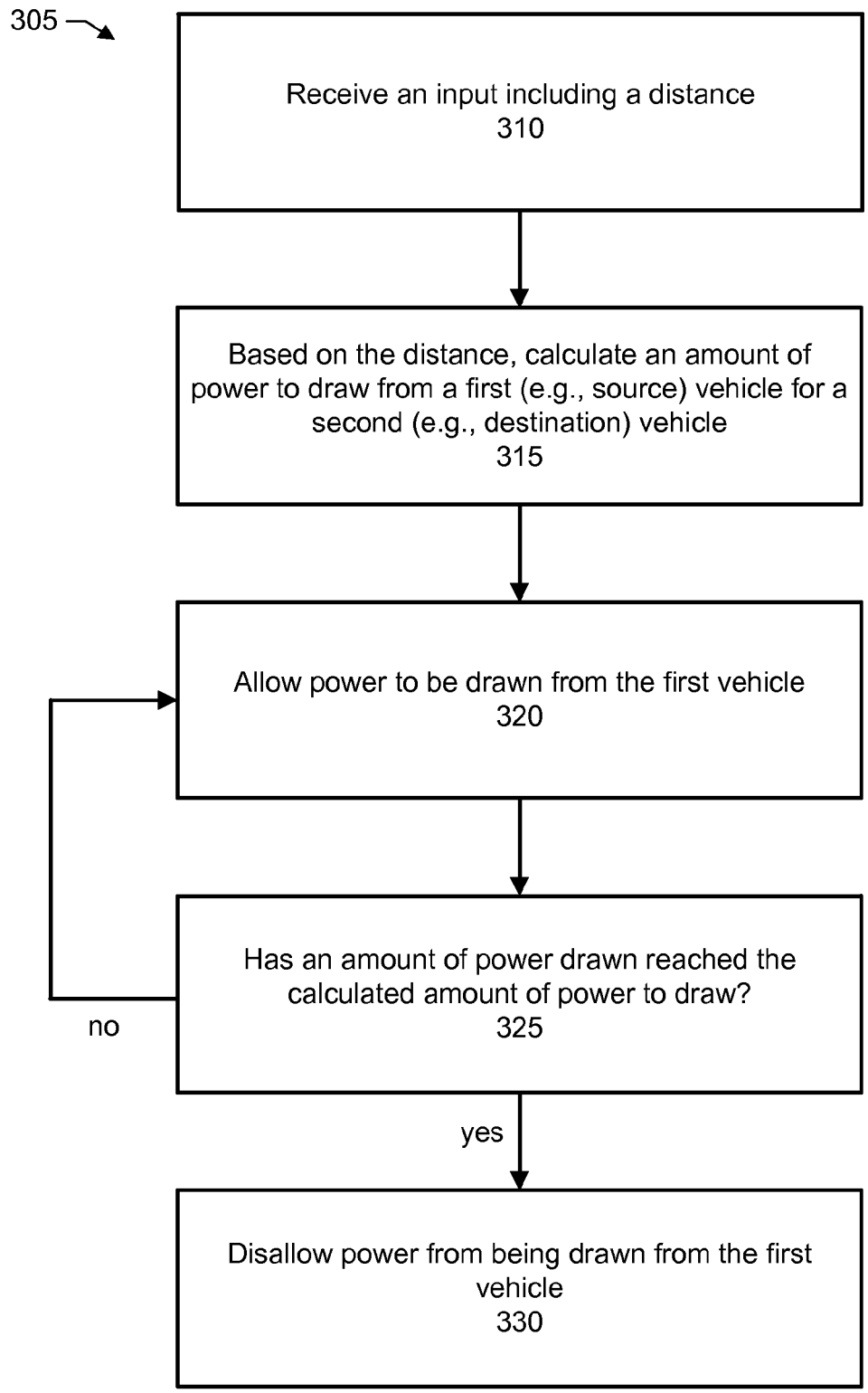
FIG. 3 shows a flow of an operation for the charging cable.

FIG. 3 shows an overall flow 305 of an operation of a charging cable. Some specific flows and techniques are described in this application, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

In a step 310, the system receives an input including a distance. For example, the user can use input device 225 to enter a value or number that corresponds to a distance. In a specific implementation, the distance is inputted as a number of miles, e.g., 20 miles. In another specific implementation, the distance is inputted as a number kilometers, e.g., 32 kilometers. It should be appreciated, however, that the distance can be inputted according to any unit of length.

In a step 315, based on the distance, the system calculates an amount of power to draw from a first vehicle (e.g., source vehicle) for a second vehicle (e.g., destination vehicle). In a specific implementation, the calculation includes multiplying the input distance by a metric representing the efficiency of the first or source vehicle, to obtain an amount of power to draw from the source vehicle. The metric can include a measure of the energy consumed per unit of distance traveled. In a specific implementation, the metric is expressed as watt hours per mile (Wh/mi). Below is an example of an equation for calculating an amount of power to draw:

amount of power to draw from source vehicle=input distance×efficiency metric

Below is an example of calculating an amount of power to draw using the equation above. This example assumes that the input distance is 20 miles and the efficiency metric is 291 Wh/mi.

amount of power to draw from source vehicle=20 miles×291 Wh/mi=5,820 Wh

Figure 4:
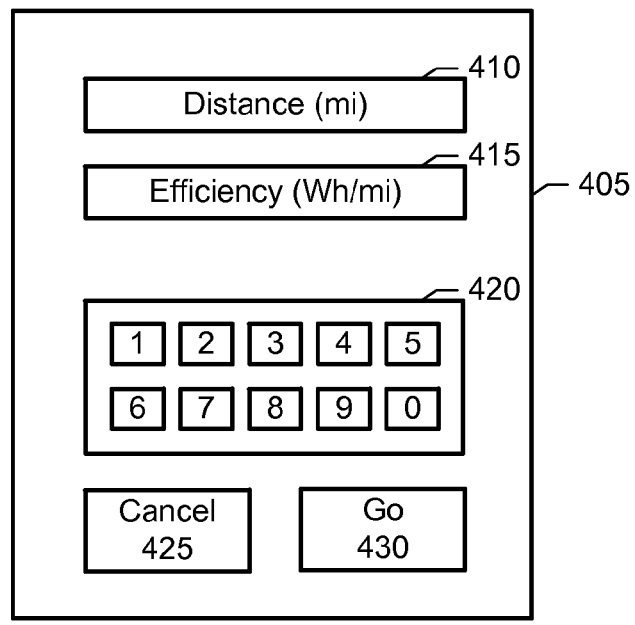
FIG. 4 shows an example of a user interface on an input device of the charging cable.

In a specific implementation, the user (e.g., driver of the source vehicle) inputs the efficiency metric using input device 225 (FIG. 2). The user may input the efficiency metric before, after, or in conjunction with inputting the distance. FIG. 4 shows an example of a graphical user interface (GUI) 405 that may be presented on the input device. The interface includes a first input box 410, a second input box 415, a software keyboard 420, a first button 425, and a second button 430.

The first input box includes a label "Distance (mi)" to prompt the user to input the distance. The second input box includes a label "Efficiency (Wh/mi)" to prompt the user to input the efficiency metric. The keyboard may be referred to as a virtual or software keyboard. The keyboard includes a set of numbered keys (e.g., 1, 2, 3, 4, 5, 6, 7, 8, 9, 0). The user can use a finger to tap the desired distance and efficiency values. The first button is labeled "Cancel." Tapping the first button cancels the charge transfer operation. The second button is labeled "Go." Tapping the second button starts the charge transfer operation.

In another specific implementation, the efficiency metric is provided to the system by the source vehicle. For example, the source vehicle may store the efficiency metric in an on-board computer or memory. In this specific implementation, the controller requests the metric when the system connects to the source vehicle. In response, the vehicle transmits the metric and the metric is received by the controller. Thus, in this specific implementation, the system obtains the metric automatically.

In another specific implementation, controller 230 stores a table that cross-references the makes and models of various vehicles with their corresponding efficiencies. The table can be helpful in cases where the user does not know the efficiency of the vehicle. In this specific implementation, the user can scroll through the table to locate and select the make and model of the vehicle. The system can use the corresponding efficiency metric associated with the selected vehicle to calculate the amount of power to draw.

Referring now to FIG. 3, in a step 320, the controller allows power to be drawn from the source vehicle for the second or destination vehicle. For example, controller 230 (FIG. 2) may enable switch 235 to pass power from the source vehicle, through the cable, and to the destination vehicle. There is a power path 260 through the charging cable. In a specific implementation, the power path is from the source vehicle, into the first connection interface, across the switch, through the cable to the second connector, out the second interface, and into the destination vehicle.

Figure 5:
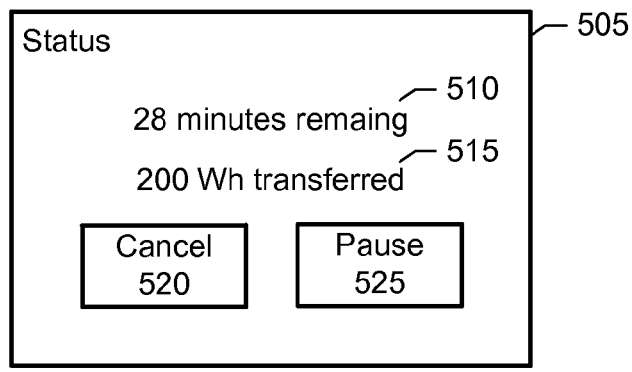
FIG. 5 shows an example of a status message being displayed on the user interface.

Monitor 240 (FIG. 2) monitors the power being transferred or drawn from the source vehicle. In a specific implementation, the system provides a status of the charge transfer operation. FIG. 5 shows an example of a GUI 505 that may be presented on the input device. In this example, the interface includes a first status item 510, a second status item 515, a first button 520, and a second button 525.

The first status item indicates the time remaining until the charge transfer is complete. The second status item indicates the amount of power that has been transferred. Tapping the first button (cancel) cancels the charging transfer operation. Tapping the second button (pause) pauses the charging transfer operation.

The status messages shown in FIG. 5 are merely examples. The system can provide other types of status. Such status can signal proper attachment of the charging cable, improper attachment of the charging cable, malfunction in a charging cable component, malfunction in the system of the source vehicle, malfunction in the system of the destination vehicle, warnings, or combinations of these.

Referring now to FIG. 3, in a step 325, the controller determines whether a total amount of power drawn has reached the calculated amount of power to draw (step 315). If the total amount of power drawn has not reached the calculated amount of power to draw, the controller continues to allow power to be drawn (step 320).

Alternatively, if the total amount of power drawn has reached the calculated amount of power to draw, the controller disallows power from being drawn from the source vehicle (step 330). In a specific implementation, the controller generates and sends a signal to the switch to disable the switch from passing power from the source to the destination vehicle. For example, the switch may be placed from a closed state in which power is passed to an open state in which power is interrupted, blocked, or prevented from passing.

Figure 6:
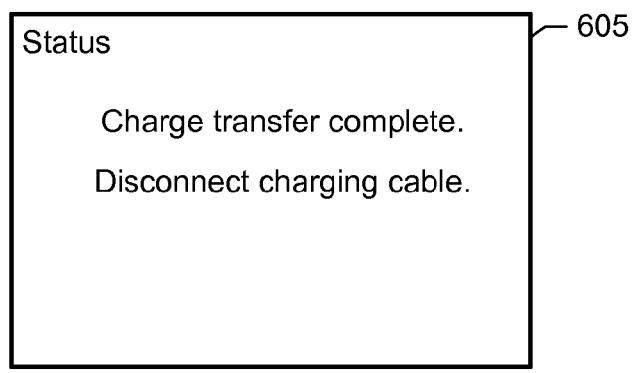
FIG. 6 shows an example of another status message being displayed on the user interface.

In a specific implementation, a further step includes a notification or alert indicating that power transfer is complete. FIG. 6 shows an example of a GUI 605 that may be presented on the input device when the power transfer is complete. A notification may instead or additionally include a text message, email, phone call with pre-recorded message, a post on a webpage, visual alert, audio alert, or combinations of these. For example, a text message may be transmitted from the charging cable, over a network, to a user (e.g., driver) of the source vehicle, a user (e.g., driver) of the destination vehicle, or both.

A benefit of a text message notification is that the drivers do not have to be next to the charging cable during the power transfer in order to monitor status. For example, if the vehicles are parked at a rest stop having a cafe or restaurant, the drivers may wait inside and enjoy a cappuccino or meal during the power transfer. Upon completion of the transfer, the system may send a text message to the drivers indicating the transfer is complete.

It should be appreciated that the user interface shown in FIGS. 4-6 are merely examples. Other components that may be included in the user interface include lights such as different colored light emitting diodes (LEDs) to indicate status, a speaker for audio output, physical controls (e.g., buttons, switches, slides, or dials), and so forth.

As discussed above, the automatic shutoff feature of the system helps to ensure that source vehicle will have a sufficient amount of power remaining in the battery pack for the driver to reach their destination. For example, the driver of the source vehicle may see that their "distance-to-empty" is 150 miles, and that their destination is 40 miles away. Therefore, the driver of the source vehicle can transfer power equivalent to about 110 miles (150 miles−40 miles=110 miles) and still be able to reach their destination.

Referring now to step 315 and as discussed above, in a specific implementation, calculating the amount of power to draw from the source vehicle is based on an efficiency metric (e.g., watt hours per mile) that is associated with the source vehicle. Thus, in some cases, the amount of power drawn from the source vehicle for the destination vehicle will not be sufficient for the destination vehicle to cover the inputted driving distance. This can be the case when, for example, the efficiency of the destination vehicle is less than the efficiency of the source vehicle. That is, the source vehicle is more efficient than the destination vehicle.

In other cases, the amount of power drawn from the source vehicle for the destination vehicle will be more than is needed for the destination vehicle to cover the inputted driving distance. This can be the case when, for example, the efficiency of the destination vehicle is greater than the efficiency of the source vehicle. That is, the destination vehicle is more efficient than the source vehicle.

In another specific implementation, the efficiency metric is associated with the destination vehicle. In this specific implementation, a method includes receiving a distance, receiving an efficiency metric associated with the destination vehicle, and based on the distance and the efficiency metric, calculating an amount of power to draw from the source vehicle for the destination vehicle.

Using the efficiency metric associated with the destination vehicle helps to ensure the amount of power transferred from the source vehicle to the destination vehicle will be sufficient for the destination vehicle to reach a charging station. For example, different vehicles may have different efficiency ratings. The difference may be due to factors such as vehicle and battery age, different driving habits, different engine designs, different vehicle designs, and so forth.

As discussed above, in a specific implementation, the efficiency metric is expressed as watt hours per mile. Other equivalent metrics can be used. For example, the efficiency metric may be expressed as watt hours per kilometer. The efficiency metric may be expressed as kilowatt hours per mile or kilometer. The efficiency metric may be expressed as watt or kilowatt hours per 100 miles or 100 kilometers. The efficiency metric may be expressed as miles or kilometers per watt or kilowatt hours. The efficiency metric may be expressed as miles per gallon gasoline equivalent (MPGe). The efficiency metric may be expressed as a ratio of distance traveled to unit of energy consumed.

The ratio values can be swapped. That is, the efficiency metric may be expressed as a ratio of energy consumed to unit of distance traveled. This specific implementation of the efficiency metric may be more comfortable with users in Europe because fuel consumption there is typically provided as liters (L) per 100 kilometers. It should be appreciated that any ratio or measurement that indicates energy conversion efficiency may instead or additionally be used to calculate the amount of power to draw.

Figure 7:
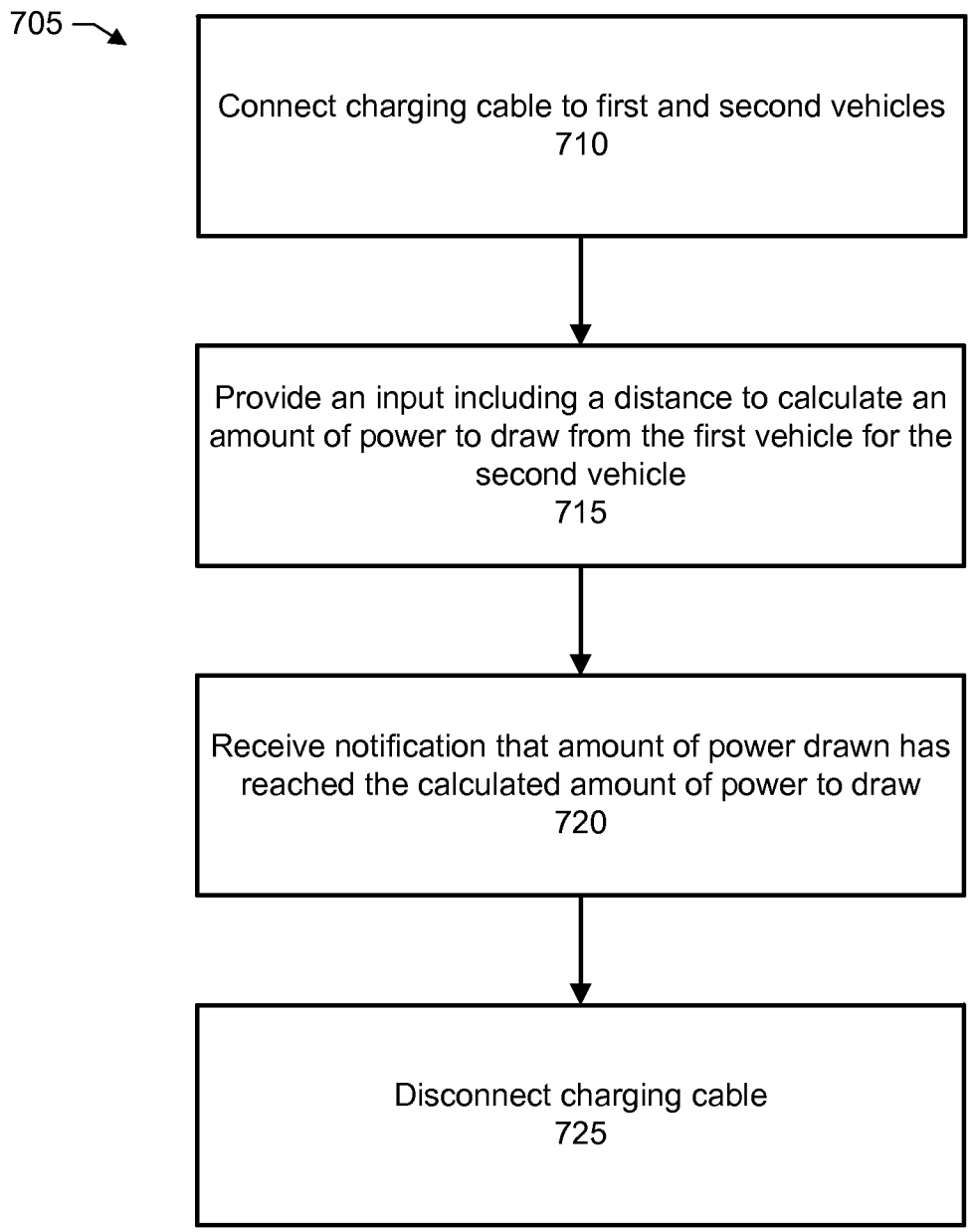
FIG. 7 shows a flow of a specific implementation for using the charging cable.

FIG. 7 shows an overall flow 705 of a user using the charging cable. The user can be, for example, a driver of the source vehicle, or a driver of the destination vehicle. In a specific implementation, the user is a road-side assistance mechanic or other road-side assistance personnel. In this specific implementation, the user may be employed by a commercial road-side assistance company, an insurance company, or both. In this specific implementation, the source vehicle can be a tow truck or other service vehicle having a portable power supply to provide emergency power.

In a step 710, the user connects the charging cable to the first and second vehicles. For example, the user may insert the first connector of the cable into the first vehicle (e.g., source vehicle). The user may insert the second connector of the cable into the second vehicle (e.g., destination vehicle).

Connections may be made in any order. For example, in another specific implementation, the user attaches the charging cable to the destination vehicle. After attaching the cable to the destination vehicle, the user attaches the cable to the source vehicle. In another specific implementation, the user attaches the cable to the source vehicle. After attaching the cable to the source vehicle, the user attaches the cable to the destination vehicle.

In a step 715, the user provides a first input including a distance. The user may provide a second input including the efficiency rating. For example, in the case of the user being a road-side assistance mechanic, the user may input the efficiency rating of the destination vehicle. Based on the distance, the system calculates an amount of power to transfer from the source vehicle for the destination vehicle.

In a step 720, when the charge transfer is complete, the user receives a notification that the amount of power drawn has reached the amount of power to draw. The notification can be as discussed above. In a step 725, the user disconnects the charging cable from the vehicles.

Figure 8:
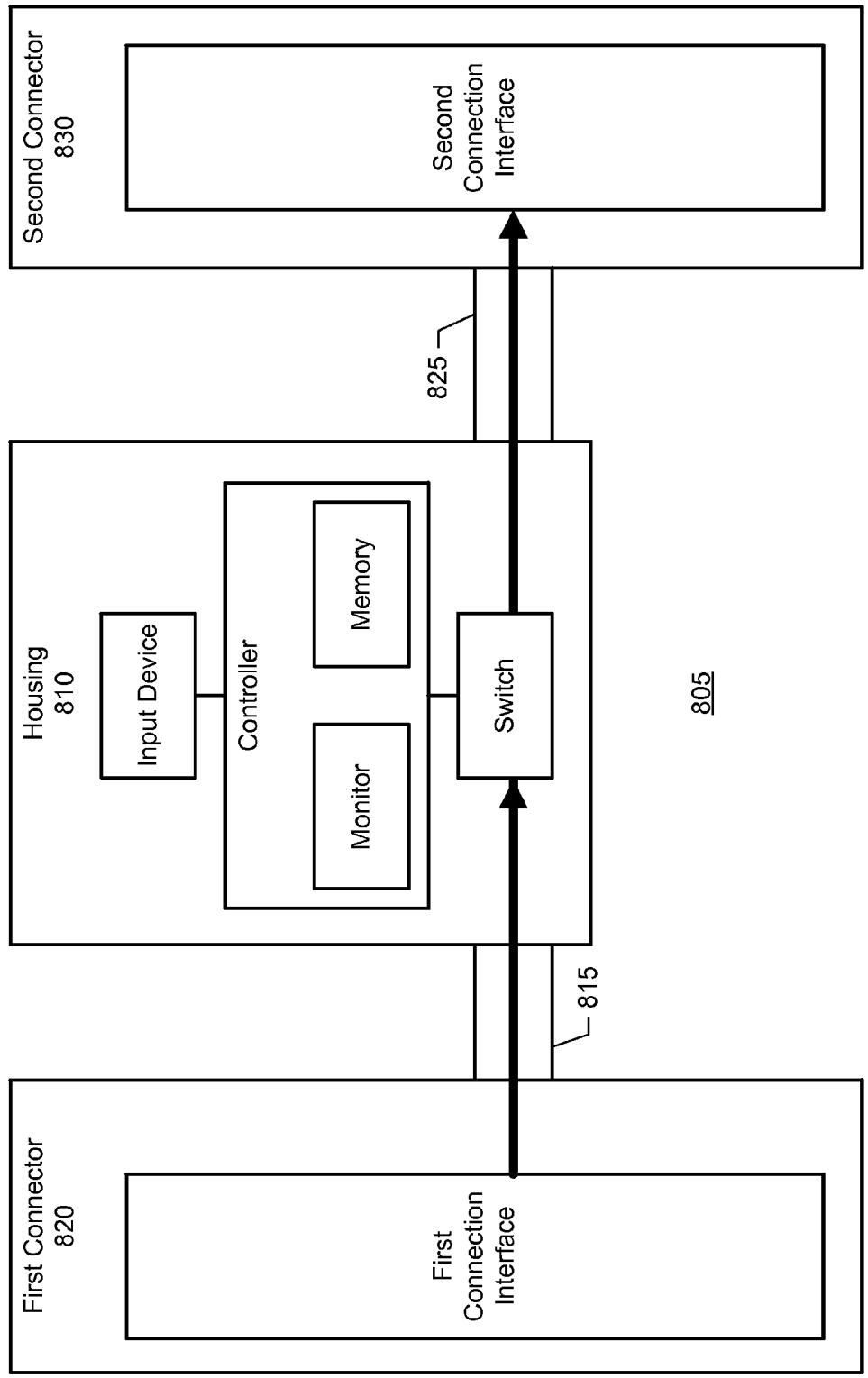
FIG. 8 shows another specific implementation of a charging cable.

FIG. 8 shows another specific implementation of a charging cable 805. This implementation is similar to the implementation shown in FIG. 2 and described above. Compared to the system in FIG. 2, there is a housing 810 for the system components that is separate from the housing of the connector. In other words, in the implementation shown in FIG. 2, the input device, controller, and switch are integrated or built into a connector.

In the implementation shown in FIG. 8, the input device, controller, and switch are enclosed in housing 810. The first and second connectors are in a different housing. There is a cable or a first portion of cable 815 between housing 810 and a first connector 820. There is a second portion of cable 825 between housing 810 and a second connector 830. Different implementations of the system may include any number of the components described, in any combination or configuration, and may also include other components not shown.

Housing 810 may be located or positioned anywhere along the cable. In a specific implementation, the housing is positioned closer to one connector than another connector. That is, the housing is further away from the other connector than the one connector. A distance from the housing to the one connector is different from a distance from the other connector to the housing. In another specific implementation, the housing is positioned equidistant between the two connectors. A distance from the housing to the one connector is equal to a distance from the other connector to the housing. A benefit of a separate housing is that the connectors can be made to have a small and compact form factor or size to improve usability as components such as the input device, controller, and switch are located elsewhere (e.g., housing 810). Housing 810 may be referred to as a case or capsule.

Figure 9:
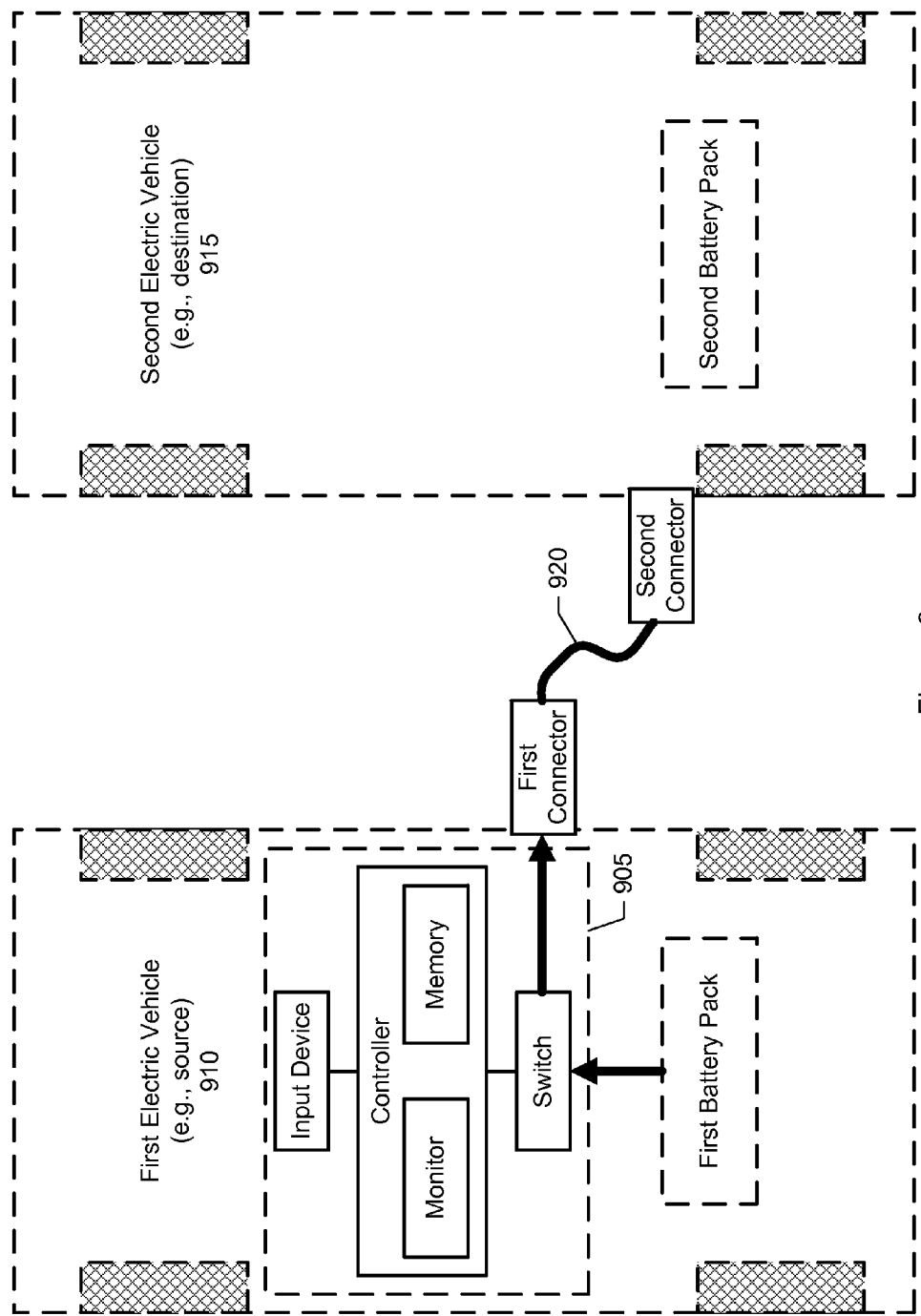
FIG. 9 shows another specific implementation for charging an electric vehicle using another electric vehicle.

FIG. 9 shows another specific implementation of a system 905 for charging a vehicle. As shown in the example of FIG. 8, there is a first or source vehicle 910, a second or destination vehicle 915, and a cable 920 connected between the two vehicles. This implementation is similar to the implementation shown in FIG. 2 and described above. Compared to the system in FIG. 2, system components 925 are integrated into first vehicle 910. The system components may be distributed throughout the various charging, control, and display systems or subsystems of the vehicle.

For example, an input device 930 may be integrated into a dashboard of the first vehicle. A switch 935 and controller 940 may be integrated into a control or charging system of the first vehicle. In the example of FIG. 9, the system components (e.g., input device, switch, and controller) are a part of the source vehicle. It should be appreciated, however, that one or more system components may instead or additionally be integrated into the destination vehicle.

Figure 10:
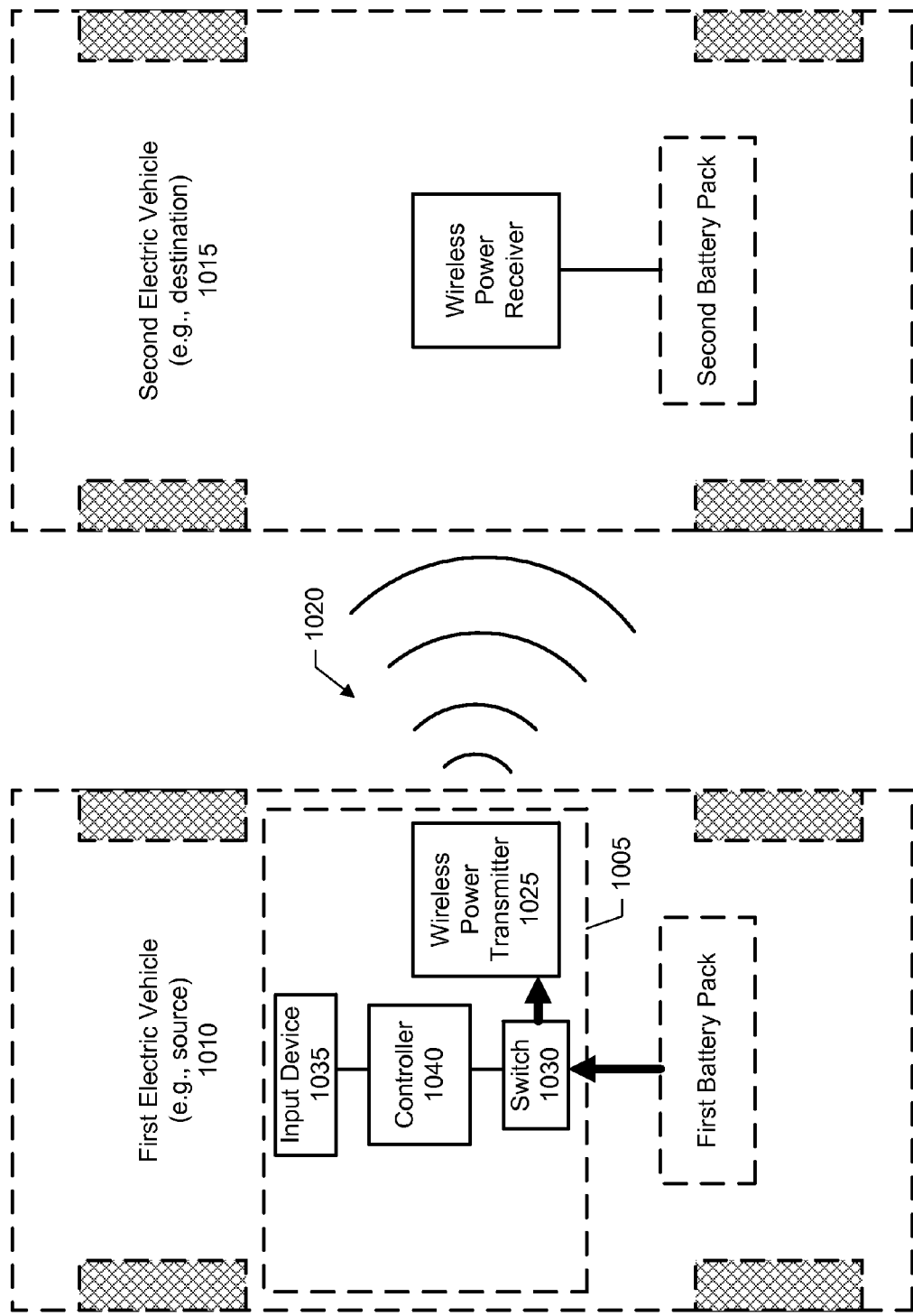
FIG. 10 shows another specific implementation for charging an electric vehicle using another electric vehicle.

FIG. 10 shows another specific implementation of a system 1005 for charging a vehicle. As shown in the example of FIG. 10, there is a first or source vehicle 1010 and a second or destination vehicle 1015. In this specific implementation, charging is through wireless power transmission 1020. In a specific implementation, wireless power is supplied through magnetic resonance. Wireless power may be supplied through inductive coupling, capacitive coupling, electromagnetic radiation, microwave power transmission, laser radiation, or any other form of wireless power transmission.

In a specific implementation, this system includes a wireless power transmitter 1025, a switch 1030 connected to the wireless power transmitter, an input device 1035, and a controller 1040 connected between the input device and switch. There can be a wireless communication interface in the first vehicle that communicates with a corresponding wireless communication interface in the second vehicle. The second vehicle may include a wireless power receiver 1045.

The switch, input device, and controller may be as described above. The wireless power transmitter may include a transmission resonance coil. The wireless power receiver may include a corresponding reception resonance coil. Power may be transmitted from the first vehicle to the second vehicle through a magnetic field.

Figure 11:
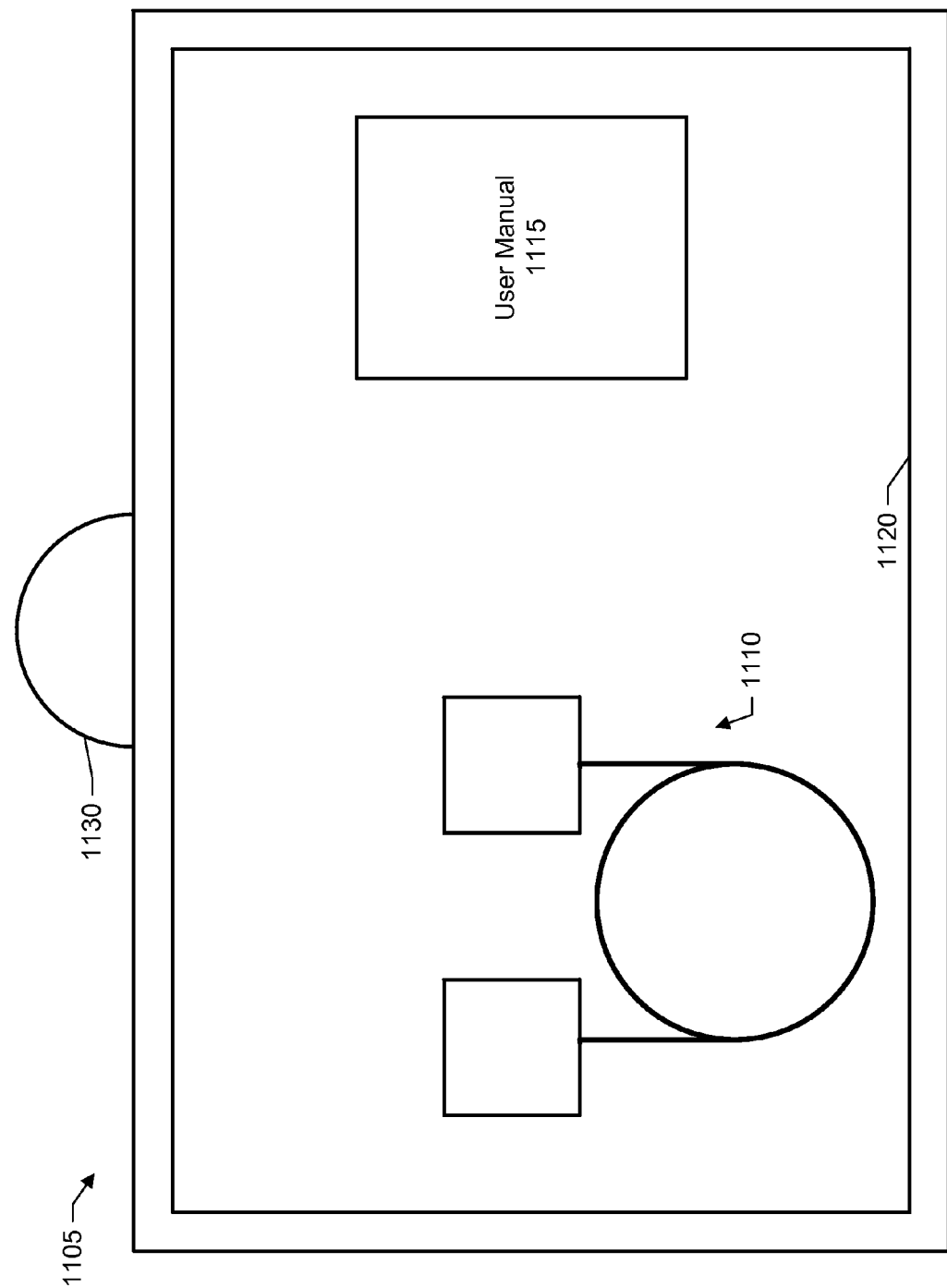
FIG. 11 shows a specific implementation of a kit having a charging cable.

FIG. 11 shows a top view of a kit 1105 for a charging cable 1110. In a specific implementation, the kit includes the charging cable, a user manual 1115, a tray 1120, and a box 1125. The charging cable can be as described in this application. The tray holds the charging cable and user manual.

The tray is designed with compartments to neatly hold and organize the charging cable and manual. The shape and depth of each compartment is customized for the item it will hold (e.g., charging cable or manual). The tray may be of a single-level or multi-level design. For example, in the single-level design, each item is accessible without removing another item. In a multi-level design, an item may be stacked above another item. The bottom item may be placed underneath the tray or may be placed in a separate tray. The tray can be made of a foam or nonfoam material.

In a specific implementation, the box is designed to allow easy placement in the trunk of a car. For example, the box dimensions may be sized such that the box is small, flat, and compact. The box may include a handle 1130. The handle allows the box to be easily removed from the car and placed back inside the car.

In a specific implementation, the box includes a clamshell design. In this specific implementation, the box includes a lid, a hinge connecting the lid to a bottom portion of the box, and a fastener. The fastener secures the lid to bottom portion of the box. The fastener helps to prevent the lid from inadvertently flipping open. The fastener may a hook-and-loop fabric mechanism (e.g., Velcro), a buckle, a snap fastener, a clip, zipper, or combinations of these. The charging cable can be accessed by unfastening and lifting the lid. In another specific implementation, the box is designed as a jacket or cover. In this specific implementation, the tray with charging cable can slide through a resealable opening of the cover. The resealable opening may include a fastening mechanism such as a described above.

In a specific implementation, the box is made of a durable material. A durable material resists wear and tear so that the box can be used as permanent or semipermanent storage for the charging cable and associated items. Some examples of durable materials that may be suitable for the box include plastic, metal (e.g., stainless steel, titanium, or aluminum), carbon fiber, wood, neoprene or polychloroprene, or combinations of these.

In another specific implementation, the box may be made of a disposable material such as cardboard or corrugated fiberboard. A material such as corrugated fiberboard can be less expensive to manufacture as compared to a more durable material such as metal. The box corners may be rounded. Rounded corners are good at absorbing impacts and preventing damage to other objects and surfaces that may come into contact with the case.

The user manual describes the features of the charging cable and how to use them. In a specific embodiment, the user manual includes a reference chart or table that cross-references various vehicle makes and models with their corresponding efficiency metrics (e.g., kilowatt hours per mile). An example of a chart is shown in the table below.

TABLE

| Vehicle Make and Model | Efficiency (watt hours per mile) |
|---|---|
| A | 291 |
| B | 250 |
| C | 300 |
| D | 275 |

To use the chart, the user can identify the make and model of their vehicle in the chart (e.g., vehicle C) and look up the corresponding efficiency.

Figure 12:
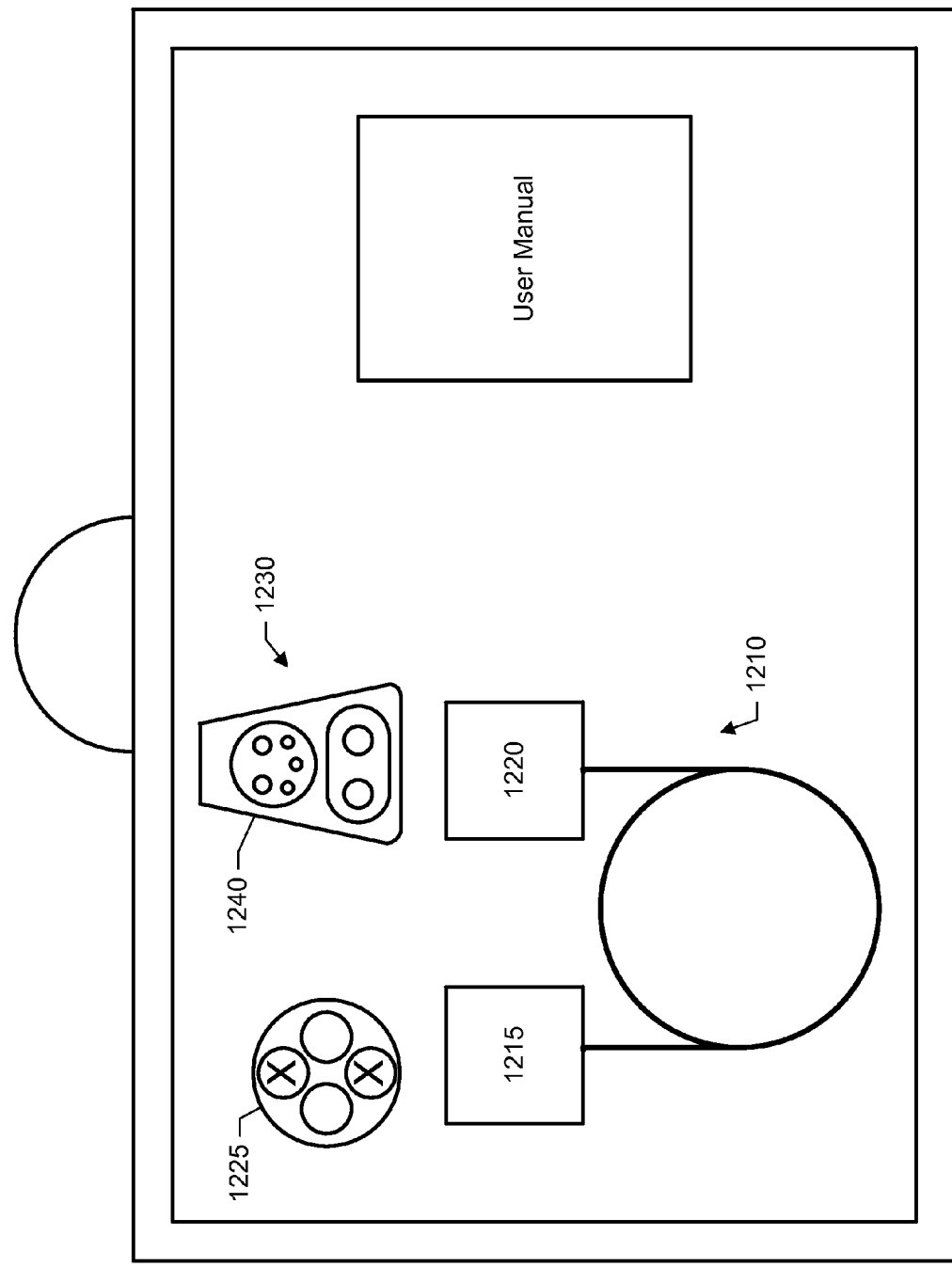
FIG. 12 shows another specific implementation of a kit having a charging cable.

FIG. 12 shows a top view of another specific implementation of a kit 1205 for a charging cable 1210. This implementation is similar to the implementation shown in FIG. 11 and described above. Compared to the system in FIG. 11, one or both connectors 1215 and 1220 of this charging cable can be fitted with an electrical adaptor 1225. The adaptor allows the charging cable to be used with a variety of vehicles that may each have their own unique charging interfaces.

More particularly, the kit in the example of FIG. 12 includes an assortment of adaptors 1230 including adapter or first adaptor 1225 and a second adaptor 1240. The view in FIG. 12 shows front views of adaptors. The first adaptor includes a first type of interface that is compatible with a first vehicle having a first port type. The second adaptor includes a second type of interface, different from the first type of interface, that is compatible with a second vehicle having a second port type.

The adapter interfaces may have different physical dimensions, different physical attributes, differently shaped receiving sockets, differently shaped prongs, a different number of prongs, a different number of receiving sockets, different prong layouts, different socket layouts, different keying features, different locking features, different electrical attributes, or combinations of these.

Typically, the user selects an adaptor having the appropriate interface type for the vehicle port type. The user connects a side of the adapter to a connector of the charging cable (e.g., connector 1215). For example, the user may push the adapter onto the connector. An opposite side of the adapter (having the appropriate interface type) can be connected to the vehicle.

FIG. 12 shows a kit having two adaptors 1225 and 1240. It should be appreciated, however, that a kit can include any number of adaptors. For example, a kit may include one, two, three, four, five, or more than five adaptors.

This application describes aspects of the invention in connection with an electric vehicle. An electric vehicle can include electric cars, electric trucks, electric buses, electric trains, electric lorries, electric aeroplanes, electric boats, electric motorcycles, electric scooters, electric bicycles, or electric spacecraft. The electric vehicle can be a hybrid electric vehicle, plug-in hybrid electric vehicle, extended-range electric vehicle, or battery electric vehicle (BEV).

Figure 13:
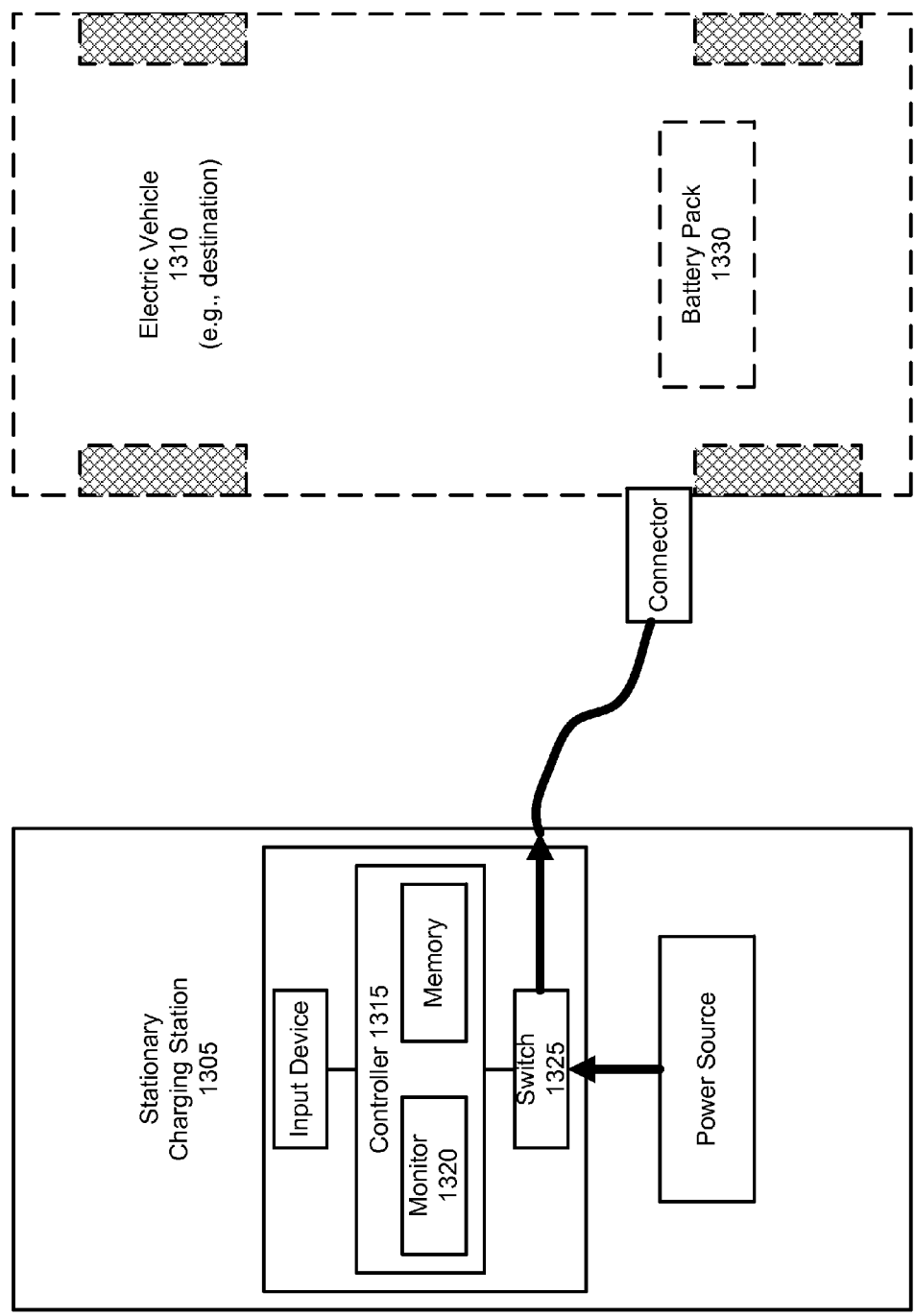
FIG. 13 shows a specific implementation of a charging station having an automatic shutoff mechanism based on an inputted distance.

As discussed above, a specific implementation of the charging cable is charging one vehicle using another vehicle. In another specific implementation, principles of the invention can be applied to electric charging stations which, unlike a vehicle, are typically designed to be stationary. For example, as shown in the example of FIG. 13, in this specific implementation, a user can provide to a charging station 1305 an input including a distance to be traveled. The charging station charges a user's vehicle 1310 with an amount of power sufficient for the distance. When the amount of power sufficient for the distance has been reached, an automatic shutoff mechanism including a controller 1315, monitor 1320, and switch 1325 stops the charging. In other words, the charging may be stopped before a battery 1330 of the vehicle has been completely charged. The controller, monitor, and switch may be as described above.

A charging station having a distance-based shutoff feature allows the driver to purchase an amount of power that will be sufficient for the driver to reach their destination. For example, while driving a driver may realize that their vehicle's battery does not have enough power to reach home. The driver can pull into a charging station and purchase just the amount of power that will be sufficient for the driver to reach home. Upon reaching their home, the driver can complete the charging of the battery in the comfort of their own home rather than waiting at the charging station. Further, charging at home may be less expensive than charging at a charging station. Thus, another benefit of the system is that users can save money by charging at home and purchasing at a charging station just the amount needed to reach their destination (e.g., home).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
receiving a first input comprising a distance;
enabling a switch of a charging cable to permit power to be drawn from a first electric vehicle coupled to the charging cable for a second electric vehicle coupled to the charging cable;
monitoring an amount of power drawn from the first electric vehicle;
determining that the amount of power drawn from the first electric vehicle is sufficient for the distance;
upon the determination, disabling the switch; and
displaying on an electric screen of the charging cable an estimated amount of time to draw an amount of power from the first vehicle that is sufficient for the distance.

2. The method of claim 1 comprising:
receiving a second input comprising an efficiency metric associated with the first electric vehicle; and
multiplying the distance and the efficiency metric to calculate an amount of power to draw from the first electric vehicle.

3. The method of claim 1 comprising:
receiving a second input comprising an efficiency metric associated with the second electric vehicle; and
multiplying the distance and the efficiency metric to calculate an amount of power to draw from the first electric vehicle.

4. The method of claim 1 comprising:
after the determining that the amount of power drawn from the first electric vehicle is sufficient for the distance, generating an alert.

5. The method of claim 3 wherein the efficiency metric indicates one of energy consumed per unit of distance traveled or distance traveled per unit of energy consumed.

6. A method comprising:
receiving a first input comprising a distance;
receiving a second input comprising an efficiency metric associated with an electric vehicle;
making a calculation involving the distance and the efficiency metric to determine an amount of power to transfer to the electric vehicle;
allowing power to be transferred to the electric vehicle;
when an amount of power transferred to the electric vehicle reaches the calculated amount of power to transfer, not allowing power to be transferred to the electric vehicle; and
displaying on an electric screen an estimated amount of time to transfer the calculated amount of power, the calculated amount of power being sufficient for the distance.

7. The method of claim 6 wherein the making the calculation comprises multiplying the distance with the efficiency metric.

8. The method of claim 6 wherein the distance is expressed as a number of miles and the efficiency metric is expressed as a number of energy hours per mile.

9. The method of claim 6 wherein when the amount of power transferred reaches the calculated amount of power to transfer, generating an alert.

10. The method of claim 6 wherein the allowing power to be transferred comprises enabling a switch coupled between a power source and the electric vehicle, and the not allowing power to be transferred comprises disabling the switch.

11. The method of claim 8 wherein the energy hours comprises one of watt-hours or kilowatt-hours.

12. The method of claim 9 wherein the alert comprises a text message.

13. A method comprising:
    obtaining a distance;
    enabling a switch to permit power to be drawn from a power source coupled to a charging cable for an electric vehicle coupled to the charging cable;
    monitoring an amount of power drawn from the power source;
    determining that the amount of power drawn from the power source is sufficient for the distance;
    upon the determination, disabling the switch; and
    displaying on an electric screen an estimated amount of time to draw the amount of power from the power source that is sufficient for the distance.

14. The method of claim 13 wherein the power source comprises a second electric vehicle.

15. The method of claim 13 wherein the power source comprises a stationary charging station.

16. The method of claim 13 wherein the distance comprises a number of miles.

17. The method of claim 13 wherein the distance comprises a number of kilometers.

18. The method of claim 13 comprising:
    upon the determination, transmitting a text message to a user of the electric vehicle, the text message comprising an indication that a drawing of the amount of power from the power source sufficient for the distance has been completed.

19. The method of claim 13 comprising:
    displaying on the electric screen a status associated with the drawing of the power from the power source.

20. The method of claim 19 wherein the status comprises information indicating a time remaining to complete a drawing of the amount of power from the power source that is sufficient for the distance.

* * * * *